United States Patent [19]
Dann

[11] Patent Number: 5,333,317
[45] Date of Patent: Jul. 26, 1994

[54] NAME RESOLUTION IN A DIRECTORY DATABASE

[75] Inventor: Ronald E. Dann, Andover, Mass.

[73] Assignee: Bull HN Information Systems Inc., Billerica, Mass.

[21] Appl. No.: 970,976

[22] Filed: Nov. 3, 1992

Related U.S. Application Data

[63] Continuation of Ser. No. 455,466, Dec. 22, 1989, abandoned.

[51] Int. Cl.$^5$ .............................................. G06F 15/40
[52] U.S. Cl. .............................. 395/600; 364/DIG. 2; 364/974; 364/974.3
[58] Field of Search ........................................ 395/600

[56] References Cited

U.S. PATENT DOCUMENTS

| | | | |
|---|---|---|---|
| 4,382,277 | 5/1983 | Glaser et al. | 364/200 |
| 4,384,325 | 5/1983 | Slechta, Jr. et al. | 364/200 |
| 4,422,158 | 12/1983 | Galie | 364/900 |
| 4,433,392 | 2/1984 | Beaven | 364/900 |
| 4,453,217 | 6/1984 | Boivie | 364/200 X |
| 4,674,066 | 6/1987 | Kucera | 364/900 |
| 4,823,306 | 4/1989 | Barbic et al. | 364/900 |

OTHER PUBLICATIONS

European Search Report for corresponding EPO patent application 90124558.9, transmitted in a communication dated May 2, 1993.
Output, vol. 14, No. 8, Aug. 1985, Goldach CH pp. 49–58; J. Pitteloud: 'La standardisation des annuaires électroniques' *the whole document* and translation.

*Primary Examiner*—Gareth D. Shaw
*Assistant Examiner*—Kakali Chaki
*Attorney, Agent, or Firm*—Gary D. Clapp; Lewis P. Elbinger; John S. Solakian

[57] ABSTRACT

A method of searching the directory of a database, held in the store of an information processing system, to identify an entry in the directory which most closely matches a search entry, each of said directory entries containing first, second and third fields, said search entry containing at least a first field, and each of said fields having the capability of including multiple parts: wherein the set of all directory entries which have the first part of the first field thereof the same as the first part of the first field of the search entry are retrieved from the directory; wherein all parts of the first field of each entry of said set are compared with a similar number of parts of the search entry and according to the degree of match of such comparison, a respective value is calculated for such degree of match; wherein similar comparisons are made between the second and third fields, if any, of each entry of the set and the search entry; and wherein the highest of such calculated values indicates the directory entry which most closely matches the search entry.

3 Claims, 8 Drawing Sheets

DIRECTORY SYSTEM 10

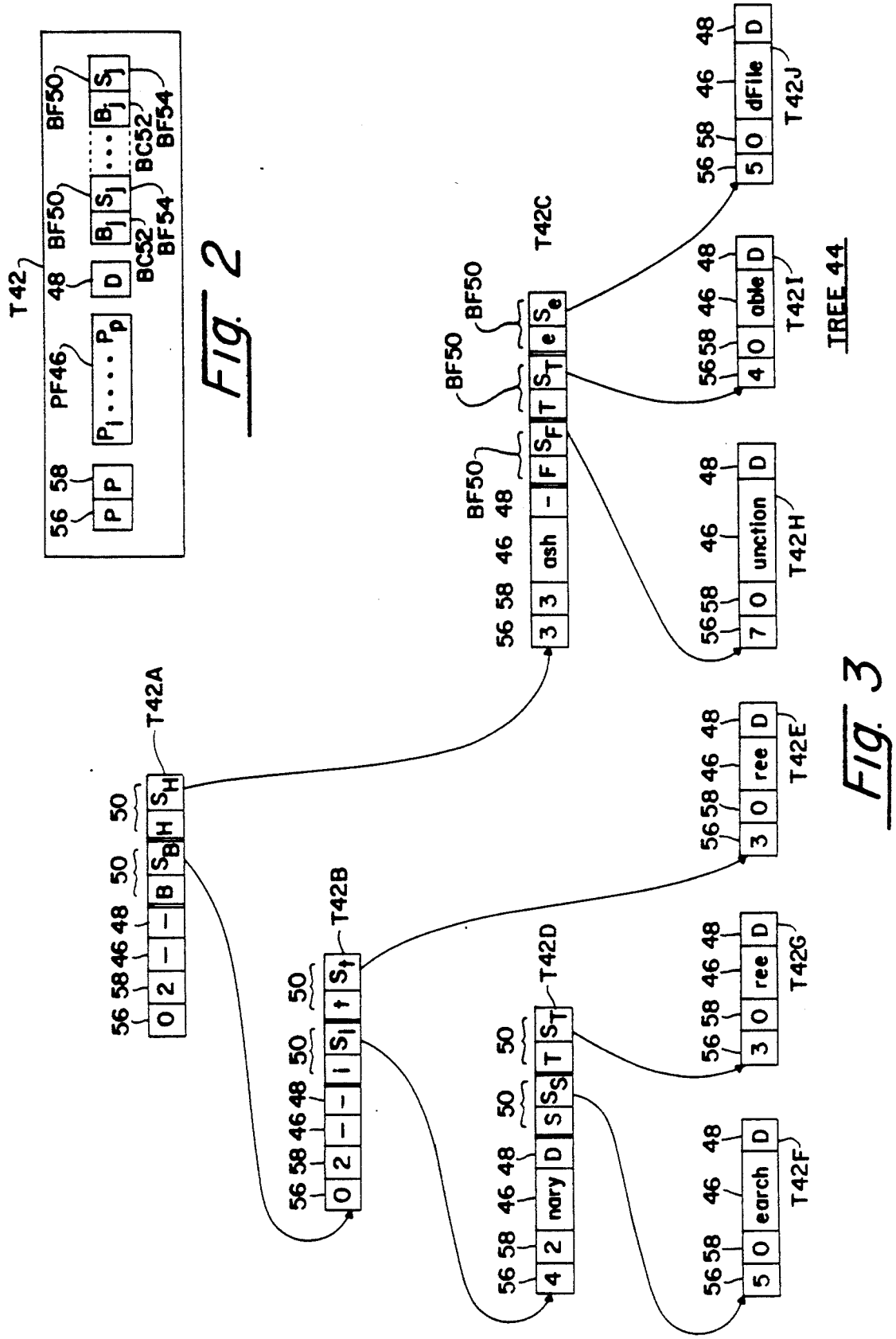

NAME RESOLUTION IN A DIRECTORY DATABASE

This application is a continuation of application Ser. No. 07/455,466, filed Dec. 22, 1989, now abandoned.

CROSS REFERENCES TO RELATED APPLICATIONS

The present patent application is related to U.S. patent application No. 414,045, filed Aug. 28, 1989 for a "Prefix Search Tree With Partial Tree Branching" by Steven P. Nickel and assigned to the assignee of the present patent application.

BACKGROUND OF THE INVENTION

1. Field of Use

The present invention relates to the location of information in a database and, more particularly, to the location of information by the resolution of information identifiers, such as names stored in a database directory with purported names provided by users.

2. Prior Art

A recurring problem in databases, in particular those implemented in computer systems, is the search for and location of specific items of information stored in an entry in the database. Such searches are generally accomplished by constructing a directory of the database, wherein the directory includes an index of database entries. The index in turn will contain keys related to the items stored in the database entries and, for each key, the location in the database of the corresponding entry. A user may then use a key associated with a given item of data in an entry to search the directory's index to find the location of the entry. One of the most common forms of keys used in directory indexes are names having some identifying relationship to the information. For example, an entry comprising a word processing file containing the text for a patent application for a method for resolving names may be assigned the name "nameres". A user may then find the text file by searching the directory for "nameres".

The use of names stored in an index to locate information in a database leads, in itself, to particular problems. A user unfamiliar with a given item of information or with the naming convention, may have difficulty in finding a name in the index and such indexes are often too large to search at random. And even a user familiar with a given database entry and the naming conventions may often forget the exact name of a given entry. The problem is therefore one of providing an directory name search and resolution method which is "friendly" to the user.

The above problems are perhaps most graphically illustrated by databases which comprise directories of information about persons. Such databases may, for example, contain information about all of the persons connected to a large computer or communications network, together with their phone numbers, addresses, network locations, positions, and so forth. This instance of a database is perhaps the most complex, in terms of identifying or locating and resolving names in the directory's index, and is the example which will be most often used in the following discussions of the present invention, although the present invention is not limited to this particular form of database or index naming convention.

One method of naming which has been often used in the prior art is "descriptive names" wherein each name is comprised of a set of "attributes". Each attribute is a piece of information of a particular type concerning an object or entry in the database, and the specific "value" of an attribute in a given instance is determined by that particular information about the corresponding database entry. For example, date of creation of an entry may be an attribute of the directory names, and the value of the attribute would be the date on which the entry was created. A given "name" is thereby specified by one or more attribute value assertions, that is, attribute type/attribute value pairs. In general, the order of the attribute value assertions is not significant and the user is required to provide only as many attribute value assertions as are necessary to unambiguously identify the corresponding data entry. The problem with such an approach is that the user must not only be familiar with the particular attributes selected to form the "names", but must get the values of at least the minimum number of assertions exactly as they appear in the names. That is, using "Katy" as an attribute value will not yield a match if the value stored in the index is "Kate".

"Alias" names, wherein a name may be identified through variants of its attributes, have also been considered as providing some degree of user friendliness. For example, if the directory contains a name having the attribute value assertions "CountryName=US" and "StateOrProvinceName=Massachusetts" then the aliases "CountryName=US,StateOrProvinceName=Mass" and "CountryName=US,StateOrProvinceName=MA" will allow the user to locate the entry having that name.

This method has severe limitations, however, in that a separate alias entry must appear in the directory for every naming variant, and attribute value assertions having many possible variants will require many aliases. This will greatly enlarge both the size of the directory and the administrative overhead to maintain the directory. The problem increases with the number of attribute value assertions comprising a given name. That is, the total number of aliases needed to support a name is the product of the number of variants for each attribute value assertion in the name. In addition, a given attribute value assertion may appear in a number of different names and in association with a variable set of other attributes. For example, "StateOrProvinceName=Massachusetts" may appear with "CountryName=US" in one name and with "Organization=HBI" in another name so that, in this instance, six aliases are required to support the three variants of "StateOrProvinceName=Massachusetts".

The problems discussed above are further aggravated when directory names are to be based upon the use of "common names" as attributes. "Common names" are frequently defined as the "name by which an object is commonly known in some defined and limited scope". Considering, for example, a directory based upon the "common names" of persons in English speaking countries, a personal name may be comprised of a personal title, such as Mr., Mrs., Ms. or Doctor, a first name, one or more middle names, a last name, and generational designations such as Jr. or II. In some English speaking cultures common names may further include titles, decorations and awards. It is apparent that, compared to most other types of attributes which may be used in names in directories, the common names of persons are capable of very large numbers of variants. In order for the directory to be "user friendly" however the directory should be able to resolve requests for directory entries when some or all of the common name attributes are absent, provided only that the components provided are sufficient to identify the entry, and that alternate versions or variants of the components should be accepted.

The magnitude of the problem may be illustrated by an example, the name "Mr. Robin Lachlan McLeod BSc(hons) CEng MIEE" which might be a typical English name If the last name were sufficient to uniquely identify this person, then the directory should resolve the name with all of the title, first name, middle name and awards components omitted, or with certain combinations of these components present and others missing. The directory should resolve the name if the first and middle names are provided as either full names or initials, or when a nickname or its initial is provided in place of the first name. There are thus two variants for each of the titles and awards, three variants for the middle name and five for the first name. Without allowing such variants as a middle name or initial without the first name or initial, there are 52 valid variants. If there were a generational designation in the name, such as Jr. or II, there would be 104 variants, and if the person had two or more middle names, as is common in England, the number of variants would triple for each additional name. Allowing subsets of the awards and initials with and without periods would further increase the allowable variants.

To further illustrate the problem of common name resolution, in certain countries the surname appears as the first element of a person's name. In yet other countries, multi-word first names are relatively common, such as Mary Ann or Billy Bob in the United States, as are multi-word last names such as De Tomaso and Conan Doyle and two component, hyphenated last names. In Spanish speaking countries, a man's legal name is comprised of a first name, multiple middle names, a surname from the father, and the mother's maiden name, which is frequently dropped in common usage.

It is apparent from just this example that a directory which exhaustively catalogues all acceptable variants of a common name attribute, whether as aliases or as additional attribute values, is impracticable as regards both the size of the directory and the efforts required to maintain the directory.

A solution to the above described problems of the prior art, and other problems is provided by the method of the present invention for common name resolution in a database directory.

It is therefore an object of the present system to provide an improved method for locating database entries through entries of their names in an index in a directory and, in particular, to do so within systems wherein the names are personal names and the entries are to be located through user provided common names which may differ significantly from their corresponding forms in the index.

SUMMARY OF THE INVENTION

The present invention may be used in an information processing system having a database and an index of entries in the database and provides a method for resolving a common name purported to identify a database entry with the database entry names stored in the index. The purported and entry names each comprise a first field, a second field, and a third field, with at least the first field including at least one word. In the instance wherein the database entries contain information relating to persons, who are to be located through their common names, the first, second and third fields of the purported and entry names contain information relating to the person's surname, their generational designations and awards titles, and their first, middle, and nicknames, respectively.

The purported names are provided to the name resolution process in a normalized form referred to as the "Common Name" format. This is a simple, free-form format, imposing the minimum standardization on the system, wherein the fields appear in the sequence "(personal name)(surname),(generation and awards)" and wherein the personal name field contains the first, middle and nickname words, where a nickname may be, for example, an alternate first name. The words of the personal name and surname fields are not separated from one another (other than by the conventional space characters) or otherwise identified and both the personal name and surname fields may contain multiple words. The only separator between the three fields in the Common Name format appears between the surname field and the generation and awards field and may comprise, for example, a comma character code. The entry names stored in the index are preferably stored in a similar standard, normalized form and, although the present invention discloses an entry name format providing greater structure than the Common Name format, the process of the present invention envisions and shows an inplementation with entry names stored in the index in Common Name format. The fields of the entry names are more readily identified, however, in that the index entry names pertaining to persons have a surname attribute as well as a Common Name attribute.

According to the present invention, the name resolution process begins by determining a match score representing an exact match between the purported name and an entry name, and the initialization of a set of count values, wherein each count value represents the similarity between a field of a purported name and a corresponding field of an entry name.

The process then constructs a set of all index entries having first (surname) fields matching the first (surname) field of the purported word by selecting a first (surname) field from the purported name and then identifying the entry names having the same first (surname) field as the purported first (surname) field.

In this step, the process selects the surname field of the purported name by identifying all portions of the purported name following the separator, or comma, as comprising the second (generation and awards) field and taking the remaining portions of the purported name, that is, all portions of the purported name preceding the separator, as comprising the third (personal name) field and the first (surname) field.

The process then selects the last word of the portion of the name so identified as the "surname" field as an initial "guess" at the surname component of the purported name. The process then identifies all index entries having either (a) surnames equal to the last word of the purported name "surname" field or (b) multiple word surnames whose last word equals the last word of the purported name "surname" field.

In the instance of index entries having multiple word surnames, wherein the number of words in the surname field of the index entry is n, the process compares the last n words of the purported name surname field, ending with the initial "guess" word, with the last n words of the index name surname field and will identify a match if the n words of the two names are equal.

Having constructed the set of index entries possibly matching the purported name according to the surname fields, the process then, for each of the entry names in the set, compares the first field of the entry name with the first field of the purported name and, if the first fields of the purported and entry names do not match, selects another entry name from the set. It should be noted that the "first field" of the pruported name varies, depending upon the number of words in the surname of the entry name. If the first fields of the purported and entry names match, the process increments the corresponding count value according to whether the match was between single word surnames or multiple word surnames.

The process then selects a second (generation and awards) field from the purported name and compares the second fields of the purported and entry names. If matches are found in the second fields, the process again increments the corresponding count value. In this comparison, the order of words in the second (generation and awards) fields is immaterial, that is, only the number of matching words in the fields is considered, not their order or sequence in the fields. A count field is incremented for each match found, and another count field incremented in matches are found between all of the words of the second (generation and awards) fields of the purported and index entry names, again disregarding the order or the words.

The process selects a third (personal name) field from the purported name and performs the following sequence of steps for each word in the third field of the purported name. This third field contains all of the words preceding the surname in the purported name.

The process compares the selected word of the purported name with the word in the same position in the third field of the entry name. If the words match, the process increments the corresponding count value, selects the next word in the third (personal name) field of the purported name and returns to the start of this sequence of steps.

If the words do not match, but a word exists in the third field of the entry name that is comparable to the word selected from the third field of the purported name, the process compares the initial characters of the words in the third fields of the purported and entry names. If the word in the third field of one name is an abbreviated, that is, initial, form of the word of the third field of the other name, the process increments the corresponding count values, selects the next word from the third field of the purported name and returns to the start of the sequence of steps.

If, in the two steps just above, the process found either an exact match or abbreviation match between the word selected from the third field of the purported name and a word from the third field of the entry name, and this was the last word in the third field of the purported name, the process will increment yet another count field and proceed to the final step for calculating a comparison score.

If the word selected from the third field of the purported name has neither an exact nor an abbreviated match in the third field of the entry name, then a mismatch has occurred. The process then drops this entry name from the set of entry names, goes to the next entry name in the set, and reinitiates the entire process for that next entry name.

An alternate or additional embodiment of the process of the present invention also provides for an additional comparison in the above sequence of steps, for alternate or alias names in the third (personal name) fields, in particular, for alternate forms of the first word of the personal name. For example, if the third field of an entry name contains the word "Ronald" that word may have associated with it the alternate or alias word "Ron". A purported name using the form "Ron" would not, therefore, find either exact match with the form "Ronald" or an abbreviated, or initial, match with "R", but would find a match with the form "Ron".

The final step of the process then determines a comparison score for the degree of similarity between the purported and entry names from the results of the comparisons described above, as a weighted sum of the count values. At this point, the process may identify an entry name of the set as most likely corresponding to the purported name, if any. If the comparison score is equal to the exact match score, the system may terminate the name resolution process and provide the entry name as corresponding to the purported name. If the comparison score is not equal to the exact match score, the system will record the comparison score, select another entry name from the set, and repeat the resolution process for another entry name. If there are no further entry names to be resolved in the set, however, the system will terminate the name resolution and provide at least the entry name most likely corresponding to the purported name.

The foregoing and other objects, features and advantages of the present invention will be apparent from the following description of the invention and embodiments thereof, as illustrated in the accompanying figures, wherein:

BRIEF DESCRIPTION OF THE DRAWINGS

FIG. 2 is a diagrammatic illustration of the structure and format of a single node of an index;

FIG. 3 is a diagrammic illustration of an index;

DESCRIPTION OF PREFERRED EMBODIMENTS

A. General Description of a Directory System 10 (FIG. 1)

Figure 1:
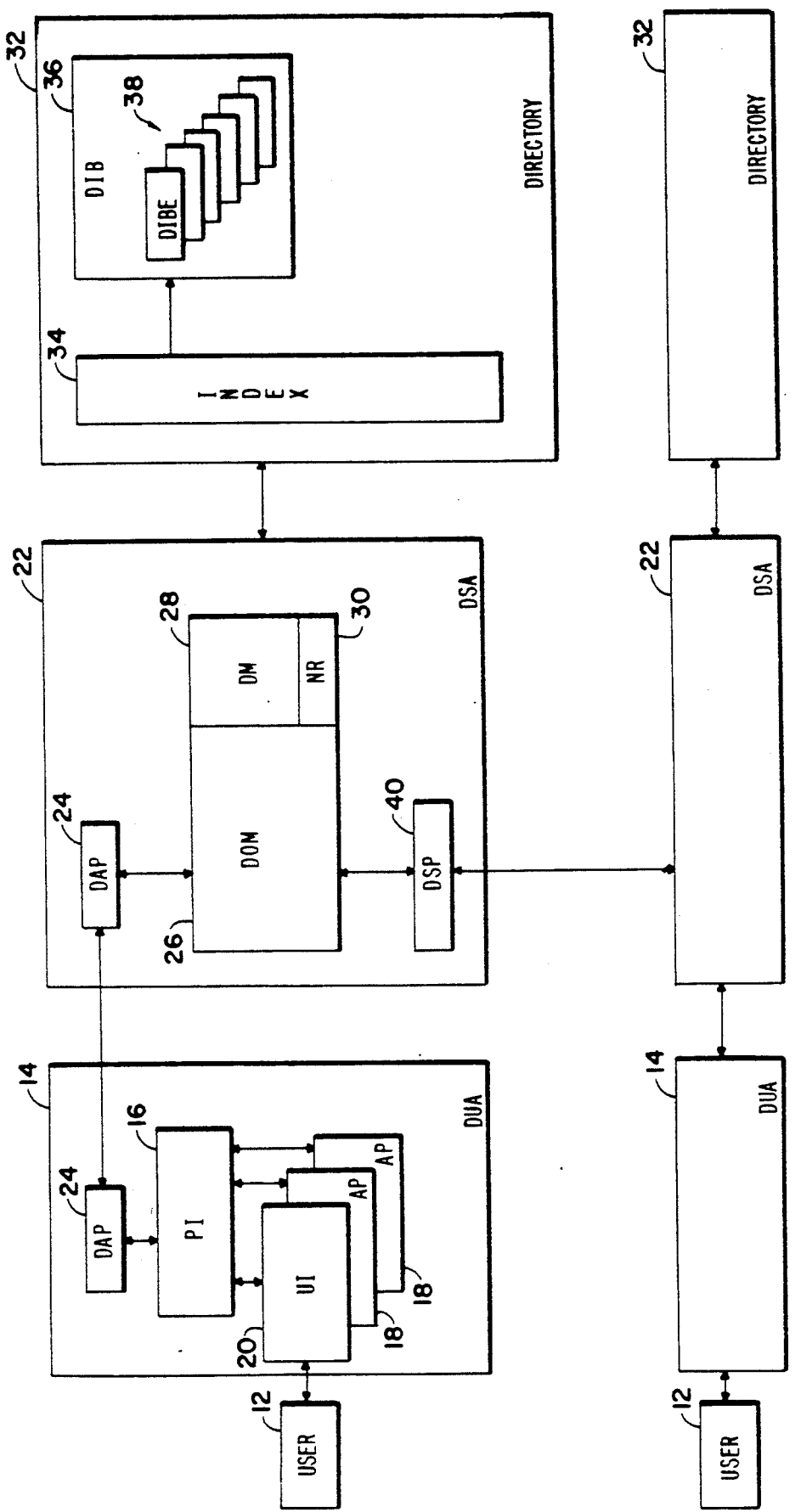
FIG. 1 is a block diagrammic representation of an exemplary directory system.

Referring to FIG. 1, therein is presented a block diagrammic representation of a Directory System 10 in which the present invention may be incorporated. In as much as Directory System 10 is presented primarily to demonstrate an environment in which the present invention may be practiced, and in not definitive of or limiting to the embodiments of the invention, Directory System 10 will be described only at the general level.

The directory implemented in Directory System 10, and as described in ISO 9594 and CCITT X.500 series of recommendations for standards, is a logical database that contains information about a set of objects, wherein each object may be generally defined as a logical "container" holding data, programs, data and programs, and, in general, information in any form. Each such object is represented by a directory entry containing a number of attributes of that object. In this regard, an attribute of an object is some defined identifying characteristic of that object; for example, some attributes of a person might be their surname, their first and middle names, their address, telephone number and birthdate. What is actually stored in the directory entry are the particular values of those attributes for that object, for example, their actual last, first and middle names and their actual address, phone number and birthdate. To illustrate by example, a given object may have the attributes "surname" and "personal name" and, in the instance of that particular object, the values of those attributes may be, respectively, "Cechony" and "Gerry".

The objects whose entries are stored in the directory will often be related to telecommunications systems, for example, the names, locations, and telephone and network locations or numbers of people, the locations, access points and resources of computer systems, and such things as OSI applications programs. The permissible types of objects are defined in the above referenced standards documents, with their associated attribute types, for example, for person object classes, the name, telephone numbers, network locations and passwords of persons.

This directory is logically modelled as a distributed hierarchical database, with a hierarchical name space. Each entry is locally identified within the name space by a Relative Distinguished Name (RDN), or local name, comprised of one or more attribute type/attribute value (AVA) pairs. The RDN of a given entry which is the child of a parent entry is unique among all of the other child entries of that parent entry.

An entry may also be identified relative to the entire name space by its Distinguished Name (DN), which is globally unique and which is the concantenation of its RDN with all of the RDNs of its ancestral entries, that is, with the RDN of all higher hierarchical entries above it in a straight line of descent.

As shown, the exemplary Directory System 10 is comprised of a set of subsystems which cooperate to perform directory services for the user. Directory System 10 as exemplified herein includes a System User (USER) 12, who requests and receives directory services and who communicates with a Directory User Agent (DUA) 14, for example, through a CRT display and keyboard or mouse. As implied by its name, DUA 14 performs operations for and on behalf of the user, including providing access to the directory to a particular directory user, which, in this sense is not limited to a USER 12 but may be either a person, that is, a USER 12, or an applications program.

DUA 14 may, for example, be a personal computer, a workstation or a computer system with terminals, and includes a Programmic Interface (PI) 16, through which applications can gain access to the directory, and one or more Applications Programs (AP) 18. Applications Programs 18 in turn include a User Interface (UI) 20, which receives input commands and requests from USER 12 and provides outputs to USER 12 and may in turn communicate with PI 16 and the other APs 18. In the presently envisioned embodiment of Directory System 10, UI 20 is a screen based graphical user interface program, such as an implementation of Microsoft Windows or the Open Systems Interconnection (OSI) graphical interface, which is based upon MIT's X-windows.

PI 16 provides functions that can be invoked to satisfy directory related requests. In the present embodiment, PI 16 accepts directory requests in the form of arguments encoded as standard C-language data types and converts them to industry standard Abstract Syntax Notation 1 (ANSI.1) encoded strings. The results of directory operations are received by PI 16 in the form of ANSI.1 strings, and are converted to standard C-language data types and provided to the applications by PI 16.

DUA 14's PI 16 communicates with a Directory Service Agent (DSA) 22 through the protocols and procedures of a Directory Access Protocol (DAP) 24 and DSA 22 in turn performs directory and directory information base management and access operations. DSA may be implemented, again, as a general purpose computer system and, as represented, includes a Directory Operations Manager (DOM) 26, which performs operations analogous to to an operating system and provides functions for management of directory requests and operations with other DSAs 22.

DSA 22 also includes, in association with and as a part of DOM 26, a Directory Manager (DM) 28 which provides directory and database management and directory access functions and a Name Resolver (NR) 30, which is a part of the present invention and which will be described in detail in the following.

DSA 22 in turn, and through DOM 26, DM 28 and NR 30, communicates with the actual Directory 32. Directory 32 includes an Index 34 and a Directory Information Base (DIB) 36 comprised of Directory Information Base Entries (DIBEs) 38. It should be noted that the DIB 36 refers to the entire global directory and that any single DSA 22 holds a fragment of the DIB 36. Directory 32 is primarily a mass storage facility with file management capabilities and may be implemented, for example, as a general purpose computer system with associated disk drives or as a specialized file server system, as is commonly known to those of ordinary skill in the art.

Index 34 comprises an index to the directory comprised of DIB 36 while the DIBEs 38 of DIB 36 in turn contain the directory entries. Each of these components will be described in further detail in the following.

Finally, and referring again to DSA 22, it will be seen that the DOM 26 shown in some detail in FIG. 1 communicates with one or more other DSAs 22 through a Directory Service Protocol (DSP) 40, and that those other DSAs 22 in turn are associated with other Directories 32, DUAs 14 and Users 12.

As described, it is envisioned in the present embodiment of a Directory System 10 that a Directory System 10, comprising a Directory 32, a DSA 22, one or more DUAs 14 and multiple Users 12, should comprise a domain or node within a larger system or network of Directory Systems 10, providing directory services for very large, distributed databases. Each domain or node will contain the database and related directory for locally resident and maintained data, comprising a subset of a global database and directory, and should store copies of directory entries or similar other domains or nodes. A USER 12 on a domain or node of the system may therefore be provided with directory services for the entire system. The DSAs 22 of the overall system are therefore interconnected through the DSPs 40 so that they may exchange directory information and provide directory services and database access across the entire system.

B. Description of an Index 34 (FIGS. 2 and 3)

Referring to FIGS. 2 and 3, therein are presented diagrammic representations of an Index 34 of a present implementation of the invention. This Index 34 is a prefix tree structure which is described more completely in U.S. patent application No. 414,045, filed Aug. 28, 1989 for a "Prefix Search Tree With Partial Tree Branching" by Steven P. Nickel and assigned to the assignee of the present patent application.

An index to a database is frequently structured as a tree comprised of one or more nodes connected by branches. Each node generally includes one or more branch fields containing information for directing a search, wherein each such branch field usually contains a pointer, or branch, to another node, and an associated branch key indicating ranges or types of information that may be located along that branch from that node. The tree, and any search of the tree, begins at a single node referred to as the root node and progresses downwards through the various branch nodes until the nodes containing either the items of information or, more usually, pointers to the items of information are reached. The information related nodes are often referred to as leaf nodes, or, because this is the level at which the search either succeeds of fails, failure nodes. It should be noted that any node within a tree is a root node with respect to all nodes dependent from that node, and such sub-structures within a tree are often referred to as sub-trees with respect to that node.

The decisions as to what directions, or branches, to take through a tree in a search is determined, at each node encountered in the search, by comparing the search key or keys and the branch keys stored in the node. The results of the comparisons determine which of the branches depending from a given node are to be followed in the next step of the search. In this regard, search keys are most generally comprised of strings of characters or numbers which relate to the item or items of information to be searched for.

An Index 34 of the present implementation of Directory System 10 is constructed as a prefix search tree providing a dense index structure using variable length, character oriented keys. Branching at any level is determined by a part of the key, rather than by the whole key, and the structure of the tree is independent of the order in which the tree is constructed.

First considering the general structure of an Index 34, an Index 34 is a tree that is either empty or is of height greater than or equal to one, that is, contains one or more levels, and satisfies the following properties:

(i) Any node, T, of the tree is of the form and type $p,s,(P_i...P_p),D,((B_i,S_i)...(B_s,S_s))$ where the $P_i$, $0<i<=p$, represent the prefix string, the tuples $(B_iS_i)$, $0<i<=s$, are branch characters and subtrees of T, respectively, and D is a pointer to a data record;

(ii) The prefix $(P_i...P_p)$ contains the longest string of leading characters shared by every key contained in T (and the subtrees dependent from T);

(iii) D is a pointer to the record with the key of length p, or is a null if there is no such key;

(iv) Each $B_i$, $0<i<=s$, is a distinct character which is the $p+1^{st}$ character of some key in T, that is, of a subtree dependent from T, whose length is greater than p;

(v) $B_i<B_{i+1}$, $0<i<s$;

(vi) Each $S_i$ is a pointer to a prefix search tree dependent from T; and, (vii) The keys in a subtree referenced by a $S_i$, $0<i<=s$, are formed form the set of keys in T having $B_i$ as their $p+1^{st}$ character, by removing their initial $p+1$ characters.

The above description of the structure of an Index 34 is illustrated in FIGS. 2 and 3 wherein FIG. 2 represents a diagrammatic illustration of the structure and format of a single node (T) 42 of a Tree 44 according to the definition presented above. As shown, T 42 includes a Prefix Field (PF) 46 which contains a prefix of length p $(P_i...P_p)$ comprised of the longest string of characters shared by all keys of every subtree dependent from node T 42, and a Data Pointer Field (D) 48 which contains a pointer to a data record having the key $(P_i...P_p)$, if there is such a key and data record. T42 also contains one or more Branch Fields (BFs) 50, each of which is comprised of a Branch Character Field (BC) 52 for storing a branch character $B_j$ and a Branch Pointer Field (BP) 54 for storing a corresponding branch pointer $S_j$. As described, each $B_j$ is the $p+1^{st}$ character of a key of length greater than p of a subtree dependent from T 42 while each associated $S_j$ is a pointer to the node T 42 of that subtree. Finally, each node T 42 may include a p Field 56 and an s Field 58 containing, respectively, the length, or number of characters, in the prefix stored in PF 46 and the number of subtrees (or data records) dependent from the node T 42, that is, the number of BF 50's contained in the node T 42. Although p Fields 56 and s fields 58 are not a necessary part of the structure of nodes T 42, these fields are provided to assist Directory System 10 in processing the nodes. That is, it is more efficient to inform the processor as to the length of the prefixes contained in the PF 48s and the number of Branch Fields 50 than to have the system extract this information from the PF 48s and BF 50s.

Certain nodes of a Tree 44 may be "leaf" nodes, which are identical in structure to the branch nodes T 42 except that they contain no Branch Fields 50 as the branches are nulls, but do contain D fields 48 containing references to data records in Directory 10's database.

FIG. 3 further illustrates the structure of an Index 34 with a Tree 44 using the key values "Btree", "Binary" "BinarySearch" "BinaryTree" "HashTable" "HashFunction" and "HashedFile"

It is apparent from an examination of the keys used for this example that the Tree 44 will have two branches, or subtrees, dependent from the root node. One branch will contain nodes for the keys having the initial character "B" (Btree, Binary, BinarySearch, and Binary Tree) and other for the nodes for the keys having the initial character "H" (HashTable, HashFunction and HashedFile). Accordingly, PF 46 of root node T 42A will be null as there is no common prefix shared between the keys starting with "B" and the keys starting with "H", and T 42A's D field 48 will also be a null as there are no data records dependent from T 42A. T 42A will contain a first BF 50 field for the T 42A subtree containing all keys having an initial character "B" and a second BF 50 field for those keys having initial character "H". Considering the first BF 50 field, the BF-52 field $B_j$ character in this field will be the character "B" as "B" is the $p+1^{st}$ character of the keys of the corresponding subtree of T 42A and the BP 54 field will contain an $S_j$ pointer $S_j$ to the first node in this subtree, T 42B. The second BF 50 field of T 42A will contain the character "H" as its $B_j$ in the BC 52 field as this is the $p+1^{st}$ character of the keys of the corresponding subtree, and the $S_j$ pointer in the BP 54 field will be a pointer $S_H$ to the first node in this subtree, T 42C. The p field 56 and s field 58 of T42A will respectively contain a 0 to indicate that the PF 46 field of T 42A contains no prefix characters, that is, is a null, and a 2 to indicate that T 42A has two "children" that is that there are two branches from T 42A.

Considering T 42B, the next branch in the keys having initial character "B" will occur between the key "Btree" having "t" as the its second character, and the keys having "i" as their second character (Binary, BinarySearch and BinaryTree). There are no common prefix characters shared between the keys branching from this node, so that T 42B's PF 46 field will contain a null, as will T 42B's D field 48. T 42B will again have two BF 50s, with the first having a $B_j$ of "i" and the second having a $B_j$ of "t" "i" and "t" being the $p+1^{st}$ characters of the keys of the subtrees dependent from these branches. The corresponding $S_j$ pointers will be pointers $S_i$ and $S_t$ to, respectively, nodes T 42D and T 42E. The p Field 56 and s Field 58 of T 42B will respectively contain a 0, indicating that the PF 46 field contains no prefix characters, and a 2, indicating that T 42B has two children, or branches.

Next considering T 42E, this node contains a reference to a data record, but no further branches to further nodes. As such, the PF 50 fields of T 42E contain nulls, that is, the node contains no PF 50 fields. The PF 46 field of T 42E contains the final portion of the key for the associated data record, the character string "ree" in the case of T 42E, and a D field 48 containing a pointer to the data record. The p Field 56 and s Field 58 respectively contain a 3, indicating that the PF 46 field contains three characters, and a 0, indicating that Leaf T 42E has no branches to subtrees.

Next considering T 42D, the other node dependent from node T 42B, the subtree of which T 42D is the root node contains the keys "Binary" "BinarySearch" and "BinaryTree" wherein the prefixes "B" and "i" of these keys are stored as prefixes in the BC 52 fields of, respectively, T 42A and T 42B. The longest prefix common to the remaining portions of these keys, that is, to "nary", "narySearch" and "naryTree" is the character string "nary". As such, the character string "nary" is stored as a prefix in the PF 46 field of T 42D.

Of the three keys in this subtree, all three keys differ in the next character following "nary" and T 42D could thus have three branches. "nary" is, however, the final portion of the key "Binary" so that rather than resulting in a branch to another node, the key "Binary" results in a pointer to the data record associated with the key "Binary" being written into the D field 48 of T 42D.

The keys "BinarySearch" and "BinaryTree" however have remaining character strings following "nary" and thus result in branches from T 42D. The $p+1^{st}$ character of "BinarySearch" is "S" so that "S" appears as the $B_j$ of a first BF 50, together with an $S_j$ pointer $S_S$ to the associated node T 42F in the BP Field 54 The $p+1^{st}$ character of "BinaryTree" is "T" so that "T" appears as the $B_j$ of the second BF 50, together with an $S_j$ pointer $S_T$ to the associated node T 42G in the BP Field 54. The p Field 56 and s Field 58 of T 42D respectively contain a 4, to indicate that the PF 46 field contains a string of 4 characters, and a 2, to indicate that there are two branches from T 42D.

T 42F and T 42G are both similar to T 42E in that these nodes contain no further branches to other nodes, and thus have non-existant BF 50 fields, but pointers to associated data records in their respective D 48 fields. The PF 46 field of T 42F contains the character string "earch", which is the final portion of the key "BinarySearch" while the PF 46 field of T 42G contains the character string "ree", which is the final portion of the key "BinaryTree". The p Field 56 of T 42F contains a 5, for the five characters in "earch" and the p Field 56 of T 42G contains a 3, for the three characters in "ree" while the s Field 58 of each node contains a zero, indicating that there are no branches from either node.

Referring briefly to the right hand subtree of Tree 44 of FIG. 3, comprised of nodes T 42C, T 42H, T 42I and T 42J, this subtree is constructed by the same principle as just described above. The keys contained in this subtree are "HashTable" "HashFunction" and "HashedFile" and the character "H" of all three keys appears as the $B_j$ of the corresponding BF 50 of T 42A as the $p+1^{st}$ character of the prefix appearing in PF 46 of T 42A. As previously described, PF 46 of T 42A contains a null character string as there is no common prefix character string between the two branches dependent from T 42A.

The longest prefix string common to the remaining portions of these keys, that is, to "ashTable", "ashFunction" and "ashedFile" is the string "ash" and "ash" accordingly appears in the PF 46 field of T 42C. Because there are three keys having a the common prefix string "ash" there will be three branches from T 42C The $p+1^{st}$ characters of the remaining portions of these three keys are, after removing "ash", respectively, "F" "T" and "e" "F" "T" and "e" accordingly appear as the $B_j$s in the BF 50s of T 42C, together with corresponding $S_j$ pointers $S_F$, $S_T$ and $S_e$ to nodes T 42H, T 42I and T 42J. The p Field 56 and s Field 58 of T 42C respectively contain a 3, to indicate a character string of three characters in PF 46, and a 3, to indicate that there are three branches from T 42C.

Nodes T 42H, T 42I and T 42J are again "leaf" nodes in that they contain pointers to data records in their D fields 48, but no further branches and correspondingly no BF 50s. The PF 46 field of T 42H contains the string "unction", which is the remaining portion of key "HashFunction" while the PF 46 fields of T 42I and T 42J respectively contain "able" and "dFile" the final portions of keys "HashTable" and "HashedFile". The s Fields 58 of each of these nodes contain 0s, as there are no branches from these nodes. The p Fields 56 of these nodes respectively contain a 7, a 4 and a 5, representing the number of characters in the remaining portions of the keys stored in their PF 46 fields.

In order to search for any given key value in an Index 34, System 10 begins at the root node and proceeds through the Index 34, node by node, until the search reaches a failure node, that is, a node which has no match for the search key, or succeeds by finding the data record corresponding to the search key.

In each node, the system compares the search key (K), which has a length, or number of characters, k, to the prefix character string (P), which has a length p, stored in the PF 46 of the node to determine whether the prefix matches at least the initial characters of the search key. That is, to determine whether $k >= p$ and $K_i = P_i$ for all $i <= p$. In this regard, it should be noted that if either the prefix P=0 or if search key K=0, that is, if either is a null string, then no characters of the search key and prefix are considered matched.

If no match is found for at least some initial portion of the search key character string, then the key value is not contained in the node and the search has failed. If there is a complete match between search key K and prefix P, that is, P=K, then the corresponding data record is pointed to by the pointer stored in the D field 48 of the node.

In there is a match between the prefix character string, which has a length p, and the first p characters of the search key character string, the system searches the $B_j$s of the BC 52 fields of the BF 50's to find a $B_j$ which matches the $p+1^{st}$ character of the key K ($K_{p+1}$). If the search finds no $B_j=K_{p+1}$, then the key value is not contained in the node and the search has failed.

If the search finds a $B_j=K_{p+1}$, then the search follows the associated $S_j$ pointer to the corresponding next node and continues the search until the search reaches either a branch node where no prefix match to another node is found, wherein the search fails, or a node having a matching prefix and a pointer to a data item. It should be remembered that the prefix for each succeeding node in the tree is comprised of the longest prefix string common to the remaining portions of the keys after removal of the leading prefix characters which have been incorporated into the prefixes of previous nodes. In a like manner, the key used to search a next node of the tree has a new key value of $K_{p+2}..K_k$, that is, is comprised of the portion of the search key remaining after removal of the leading key characters which have been matched to prefixes and $B_j$ characters in previous nodes.

The tree structure of Index 34 thereby lends itself to a hierarchical name resolution wherein each successive node descending through the tree is distinguished by a prefix which is a Relative Distinguished Name (RDN) and wherein the Distinguished Name (DN) of the node is the concatenation of its RDN with all of the RDNs, or prefixes, of its ancestral nodes. The Relative Distinguished Names and Distinguished names of the nodes are, of course, those of any corresponding directory entries (DIBEs 38) in DIB 36, which are pointed to by the contents of the D Fields 48 of the nodes.

As has been previously described, therefore, each prefix contained in a node is comprised of one or more AVAs, that is, the attribute type/attribute value pairs comprising its Relative Distinguished Name. As has also been described, the Distinguished Name of a given node, and its corresponding DIBE 38 in DIB 36, may be constructed by concantenating the RDN's of all ancestral nodes with the RDN of the given node.

In general, any search of Index 34 begins at a root node and progresses downwards through the various branch nodes until the nodes containing either the items of information or, more usually, pointers to the items of information are reached. At each node, the AVAs comprising the RDN residing in the Prefix Field 46 of the node are resolved, or compared, with the corresponding AVAs of the purported Distinguished Name provided by a user to determine whether the search should continue to another node, and which other node, or whether the search had finally resolved the purported Distinguished Name. If the purported Distinguished Name has been successfully resolved with the Distinguished Name of a node, then the contents of that node's D Field 48 will point to the DIBE 38 having that Distinguished Name.

C. Directory Information Base (DIB) 36 (FIG. 4)

Figure 4:
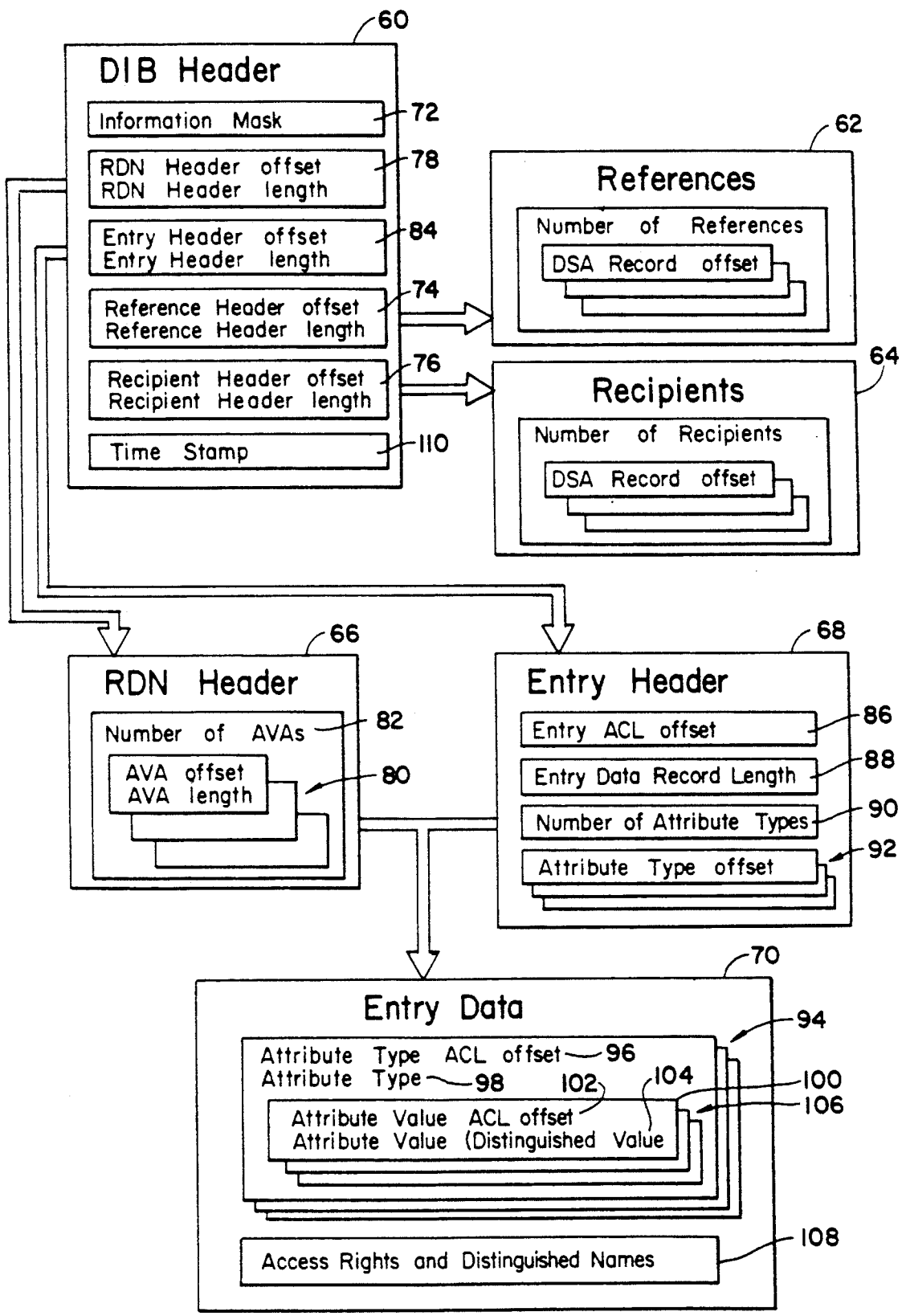
FIG. 4 is a diagrammic representation of a directory information base entry.

Referring to FIG. 4, therein is shown a diagrammic representation of a Directory Information Base Entry (DIBE) 38. As was described just above, each Distinguished Named residing in a Directory 32 has a corresponding leaf node in Index 34 and a corresponding DIBE 38 in DIB 36. The DIBE 38 containing the information sought is identified and pointed to by a Directory Information Base Header (DIB Header) 60, described below, which resides in the D Field 48 of the leaf node 42.

In addition to a Directory Information Base Header (DIB Header) 60, which contains the set of pointers to the other elements of the DIBE 38, the DIBE 38 may include a References Block 62 and a Recipients Block 64 and includes a RDN Header Block 66, an Entry Header Block 68, and an Entry Data Block 70, which comprises the actual directory entry. In the present embodiment of the system incorporating the present invention, these elements are contained within a single file stored in the Directory 32 database.

Each DIB Header 60 contains an Information Mask Field 72 which contains fields for storing information identifying the types of information or data stored in the DIBE 60 for the associated Distinguished Name. Such information may include, for example, whether the data is a master copy of a directory entry, whether other DSAs 22 contain copies of the entry, or whether the entry is a "shadow" copy of an entry held by another DSA 22.

A DIB Header 60 may also contain a number of other fields, dependent upon the types of information contained in the entry. An entry may, for example, be a "knowledge reference" used for "navigation" that is to locate entries in the global DIB. DIBE 38 would then include a Reference Block 62 containing a count of the number of such references and a corresponding set of offsets for the records containing such references. DIB Header would then contain a Reference Header Field 74 pointing to the Reference Block 62.

If other DSAs 22 contain shadow copies of the directory entry, the DIBE 38 would include a Recipients Block 64 containing a count of the number of such recipients and a corresponding set of offsets to the records identifying the recipients. DIB Header 60 would then contain a Recipient Header Field 76 pointing to the Recipients Block 64.

DIB Header 60 will include a Relative Distinguished Name Header Offset/Length Field 78 containing the location and size in the Directory 32 database of the RDN Header Block 66. RDN Header Block 66 in turn contains a set of AVA Offset/Length fields 80 similarly identifying the locations and sizes of a corresponding set of AVA entries in the database. These AVA entries in turn contain the values of the particular attributes which comprise the Relative Distinguished Name (RDN) of the directory entry. RDN Header Block 66 also contains an AVA Number 82 indicating the number of attribute type/attribute value entries comprising the RDN.

DIB Header 60 also includes an Entry Header Offset/Length Field 84 containing the location of the Entry Header Block 68 in the DIB 38 file. Entry Header Block 68 in turn contains an Entry Access Control List (Entry ACL) Offset field 86 for storing the location of an access control list identifying what users or elements of the system may have access to the entry, an Entry Data Record Length field 88 for storing the size of the Entry Data Block 70 and a Number Of Attribute Types field 90 storing the number of different types of attributes appearing in the entry. Finally, the Entry Header Block 68 contains an Attribute Type Offset field 92 for each attribute stored in the Entry Data Block 70. As will be described further below, each attribute type appearing in the entry may have more than one value stored in Entry Data Block 70; each Attribute Type Offset field 92 contains the offset, relative to the start of the DIBE 38 file in Directory 32, of the first value entry of the corresponding attribute type.

Referring to the Entry Data Block 70, the Entry Data Block 70 contains a set of Attribute Fields 94 for each attribute appearing in the entry. Attribute Fields 94 include an Attribute Type Access Control List (ACL) Offset field 96 identifying the location of any access control list that applies to the entire attribute, and an Attribute Type field 98 containing an identifier for the attribute type. The start of Attribute Fields 94 are pointed to by Attribute Type Offset fields 92 of Entry Header Block 68.

Attribute Fields 94 further include a First Attribute Value field 100, which in turn has Attribute Value field 104 containing the first value of the attribute appearing in the entry and an Attribute Value ACL Offset field 102 identifying the location of any access control list that applies to the first value of the attribute.

Attribute Fields 94 may also contain an Attribute Value fields 106 for each remaining value of the attribute appearing in the entry. Each Attribute Value field 106 has an Attribute Value field 104 and an Attribute Value ACL Offset field 102, in the same manner as the First Attribute Field 100.

The locations of the first Attribute Fields 94 for the entry is pointed to by AVA Offset/Length fields 80 of RDN Header Block 66, if the attribute is part of the entry's Relative Distinguished Name.

Finally, and associated with the Attribute Fields 94 of each attribute appearing in the entry, are a set of Access Control Fields 108, which appear in the file after the attributes. Access Control Fields 108 identify, for each protected item (entry, whole attribute, or single attribute value), the access rights, user class, and Distinguished Name of a user or group of users which may access the attribute.

Lastly, if the entry is a shadow copy of an entry residing in another DSA 22, DIB Header 60 will include a Date/Time Stamp Field 110 indicating the time at which the shadow copy entry was created.

The previous descriptions have illustrated the environment in which the present invention is practiced. The following will describe how entries are located by resolving their Distinguished and Relative Distinguished Names from attribute type/attribute value pairs and, in particular, the method of the present invention for user friendly name resolution.

Figure 5:
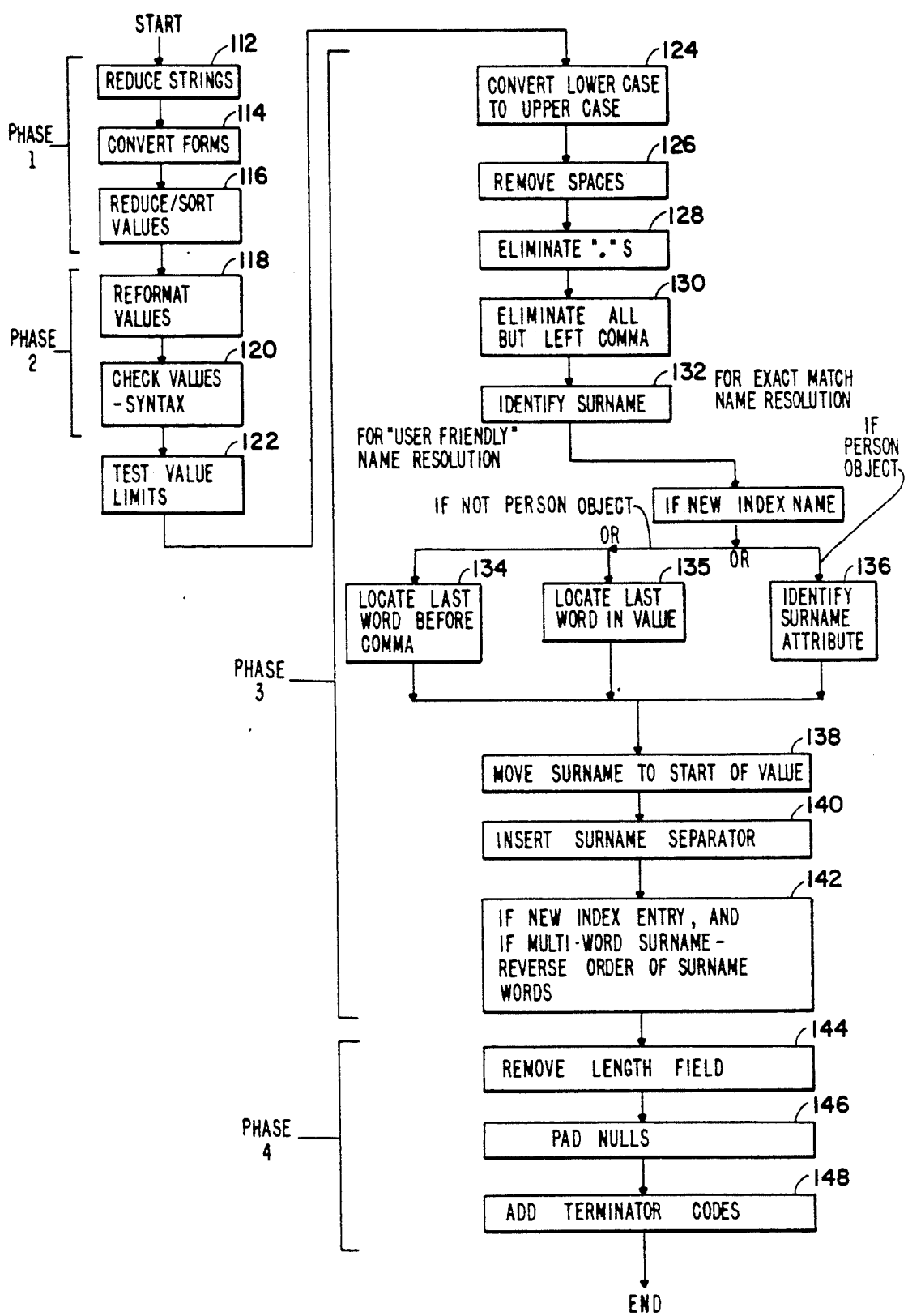
FIG. 5 is a flow diagram illustrating the normalization of names.
Figure 6A:
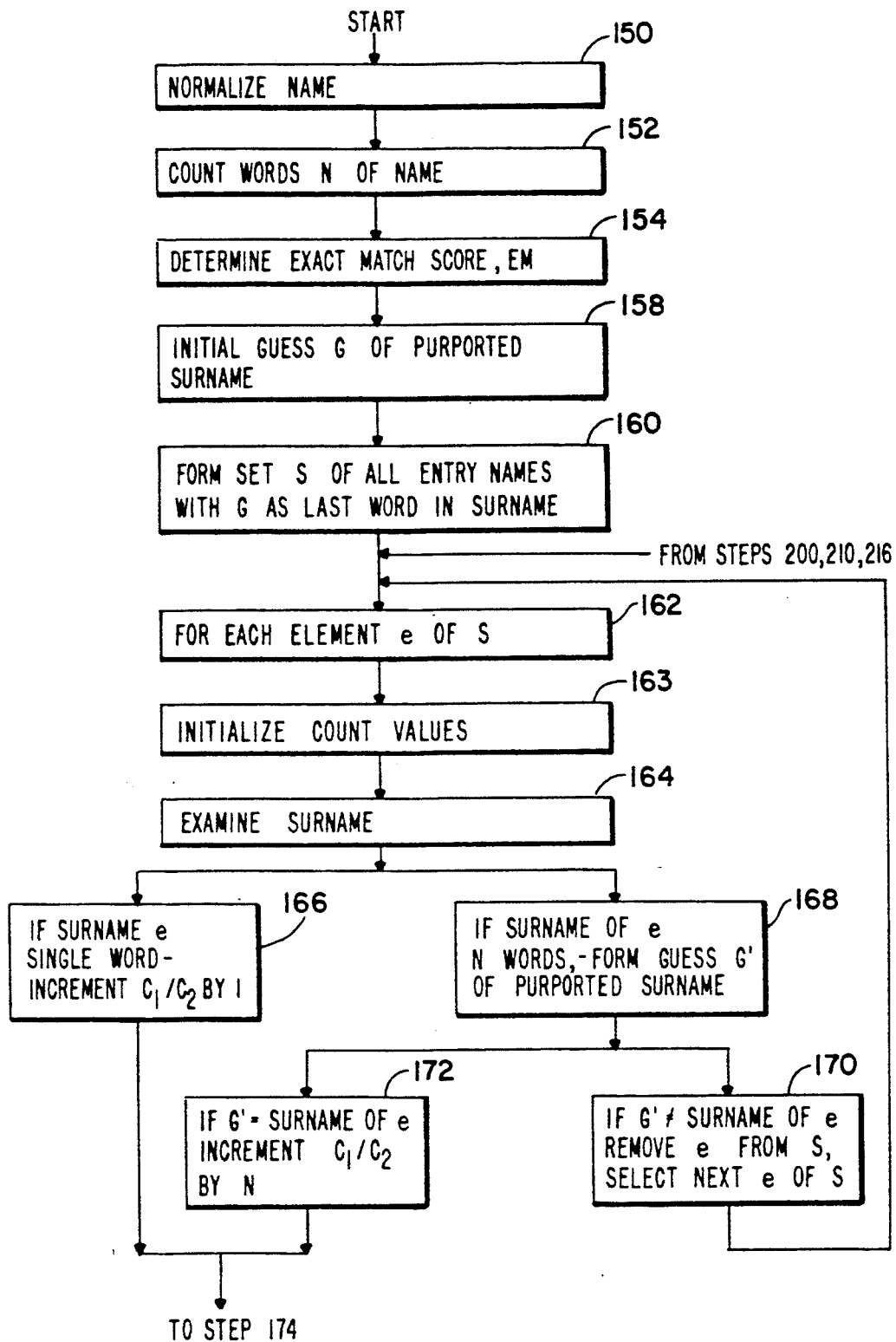
FIG. 6, consisting of A-D, is a flow diagram illustrating the name resolution method of the present invention.
Figure 6B:
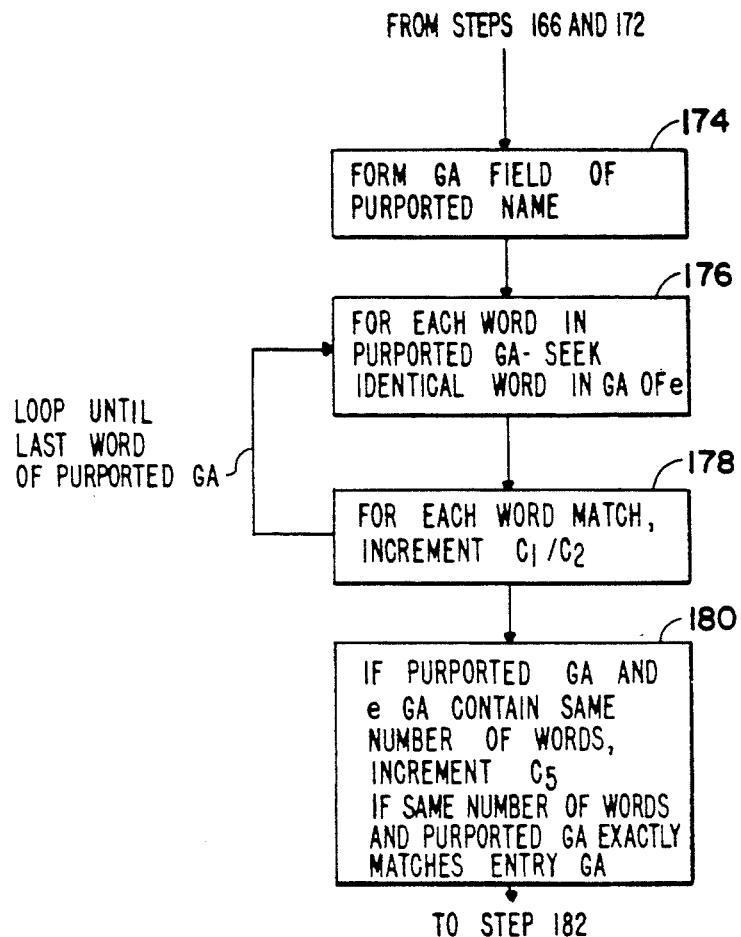
Figure 6C:
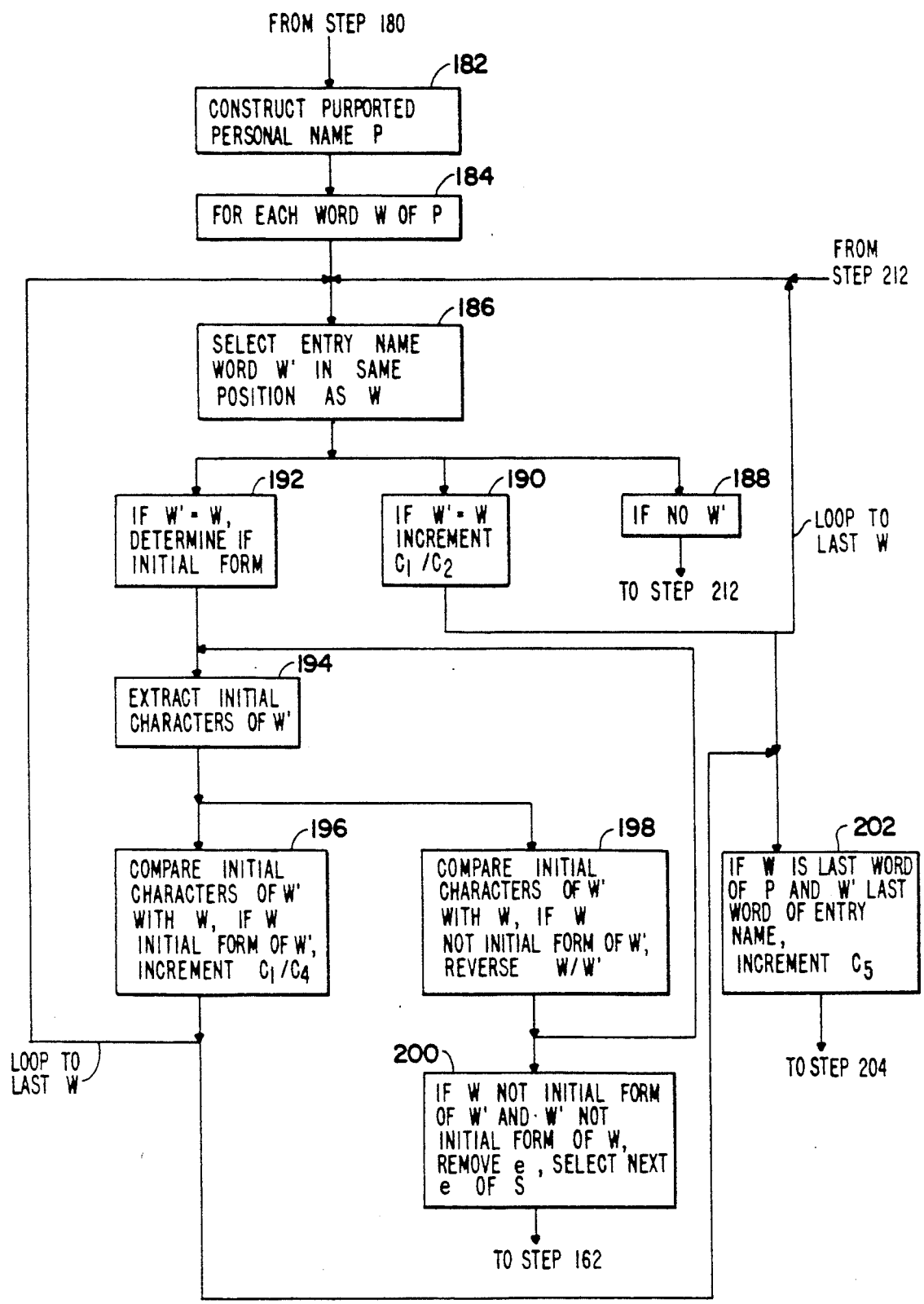
Figure 6D:
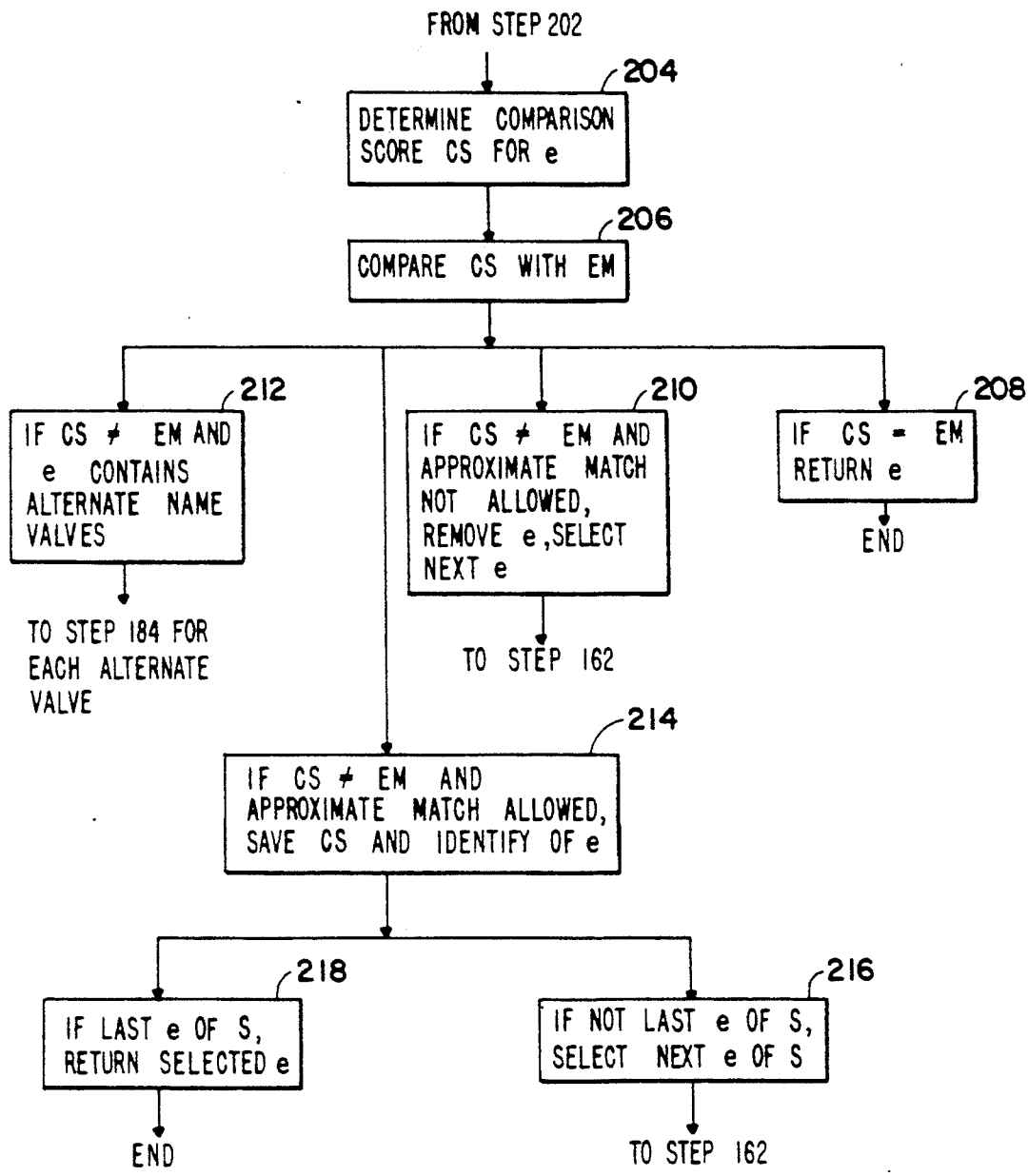

D. Name Resolution (FIGS. 5 and 6)

As described, the purpose of the present invention is to provide a method for relating, or resolving, a purported name provided by a "user" for example, a person using a system, an applications program or a system level program, to a name stored in a directory. In particular, the following describes a method for resolving the name when the purported name does not completely match the Distinguished Name as entered in the directory, for example, when the purported name contains only a part of the Distinguished Name, or portions of the purported name differ from the expression of the corresponding parts of the Distinguished Name.

The following descriptions of the present invention are illustrated for the case of personal names. As was previously discussed, personal names represent unusual difficulties in name resolution, due to the variations in form that personal names can take, for example, due to national and linguistic characteristics, and the variety with which users may express purported names.

It is first necessary to consider the formats in which purported names will be presented by a user and in, which Relative Distinguished Names will be stored a Directory 32.

In the case of both purported and entry names, it is preferable that at least a minimum degree of standardization be imposed to reduce the requirements on the name resolution programs. It is equally preferable, however, that no more standardization than is necessary be imposed, so that the purported name format remains sufficiently flexible to adapt to the widest possible range of forms of personal names, and so that a user has the freedom to express purported names in a manner that is customary or familiar for the user.

For these reasons, Directory System 10 uses the Common Name format (purportedCN) for both purported and entry names, as expressed in extended Backus-Naur form, of:

```
purportedCN ::= [personalName] surname
[,generationAndAwards].
```

The personalName subcomponent includes one possibly multi-word first name or an alternate first name (sometimes referred to, as a nickname, although a "nickname" may also be a name entirely unrelated to the person's actual name), and one or more middle names, in order, and wherein any of these name elements may be replaced by initials, with or without trailing periods ('.'). Hyphenated names, such as Jean-Paul may be abbreviated in any of three ways, that is, as "J" as "JP" or as "J-P". The surname sub-component may contain more than one word and may contain hyphenated elements and must by supplied in full. The generationAndAwards sub-component, that is, Jr. or II or honorable and awarded titles, may be supplied in any order and in any sub-set of the person's actual generation and awards name elements, though the generational element usually appears first in the sequence. This standardization is sufficient to permit accurate parsing of most purported Common Names, but not so rigid as to prevent users, including foreign users, from inadvertently conforming to the standard in most instances.

As regards the format for Distinguished Names, Directory System 10 is intended to allow the resolution of Distinguished Names by use of Common Names, previously defined, and Common Name is accordingly an attribute type in Directory System 10.

In alternate embodiments of the system incorporating the present invention, for example, wherein the system was under the complete control of a single administration and did not have to communicate with "foreign" systems, or where a higher degree of possible imcompatability was allowable, it is possible to use name formats with a higher degree of structure and definition.

An alternate embodiment of the present system accordingly defines an alternate format for the values of the Common Name attribute type which will permit the sub-components of a Personal Name to be unambiguously identified. As described, Directory System 10 is an object based system and defines objects relating to persons to be of the Person object class and subclasses. The alternate embodiment of Directory System 10 accordingly uses a corresponding attribute type, that of PersonName, to define the attributes of Person class objects.

PersonName is specific to personal names, and is defined in Directory System 10, using ASN.1, as:

```
PersonName ::= SEQUENCE {
    surname                         nameComponent,
    firstName                  [0]  nameComponent OPTIONAL,
    alternatefirstname         [1]  SET OF nameComponent
        OPTIONAL,
    middleName                 [2]  SEQUENCE OF nameComponent
        OPTIONAL,
    decorationOrAward          [3]  SET OF nameComponent
        OPTIONAL,
    generationalQual           [4]  nameComponent OPTIONAL   }.
```

Wherein each "name Component" is represented as a case insensitive string.

The Common Name formats of purported names and personal name RDNs, as stored in DIB 36, are therefore normalized to a common form before they are used in a name resolution operation.

For reasons of efficiency, the Common Name Attributes of each RDN stored in DIB 36 are not normalized for each Index 34 search operation, but are normalized when the nodes of Index 34 are constructed and the RDNs of DIB 36 are stored in Index 34's Prefix Fields 46, as previously described, in their normalized form. If necessary, the original, Common Name Attribute form of personal name RDNs may be retrieved from the directory entries. The purported names submitted by users for search in Index 34 are normalized, of course, when submitted for a search operation.

Normalization, which is illustrated in FIG. 5, normally occurs in four phases with each phase further processing the results of previous normalization operations and each phase being executed on an AVA-by-AVA basis. In as much as such normalization operations are well known to those of ordinary skill in the art, the following will describe the normalization operations only briefly and is illustrated on a step-by-step basis in FIG. 5 for the Common Name format.

The first phase takes place at the ASN.1 level and reduces the ANS.1 encodings of the attributes to standard forms which permit the direct comparison of ANS.1 encodings to determine whether two encodings are identical. In this phase:

Step 112—Constructed strings are reduced to primitive strings;

Step 114—Indefinite length forms are converted to definite length forms and, if possible, long length forms converted to short length forms; And, Step 116—The values of the attributes are reduced to standard forms, such as boolean values and bit strings, and the elements of the sets are sorted according to the order of their tags and values.

The second phase takes place at the syntax level and:

Step 118—reformats each attribute value as directed by its attribute syntax; And, Step 120—Checks for conformance of the attribute values to the attribute syntaxes. These operations are dependent upon the individual types of syntaxes.

The third phase of normalization takes place at the attribute type level and:

Step 122—Tests that the values of the attributes fall within the limits on the attribute values and restructures the values as directed by the attribute types.

It is at the third phase of normalization that the Common Name attribute values are restructured for use with the name resolution method of the present invention.

Only the attribute values actually used in the name resolution are restructured, and this operation entails the steps of:

Step 124—Converting lower-case letters to uppercase;

Step 126—Removing any leading or trailing spaces and redundant embedded spaces (Note: this step is actually performed by Step 118, but may be performed as a Step 126 if not previously done in Step 118);

Step 128 Eliminating all period ('.') characters; and

Step 130—Eliminating all but the leftmost comma from the attribute value;

The next steps are used only when the system is to be able perform an exact match algorithm, as described elsewhere herein, to normalize a purported Common Name for addition to Index 34; otherwise, the process will proceed directly to Step 136;

Step 132—Identify the surname component;

In the instance of a purported Common Name:

Step 134—Locate the last "word" in the name before the last comma, if any; or,

Step 135—Locate the last word in the attribute value;

Step 138—Identify the surname of the Common Name, surname being a required attribute of an object of the Person class, as described above, or follow Steps 134 and 135 if the new entry does not correspond to an object of the Person class;
and Step 138—Move the surname component to the beginning of the attribute value;

Step 140—Insert a binary zero byte after the surname field to function as a character separator;

Step 142—If the surname was found in an new data entry to Directory 32, and if it contains more than one word, reverse the order of the words of the surname in the reformatted form of the surname.

Finally, the fourth phase of normalization is invoked only for those AVAs stored in Index 34. This final operation:

Step 144—Removes the first, and probably only, length field from the encoding of the attribute value;

Step 146—Pads each null byte found in the value with a second null value; and,

Step 148—Adds AVA and RDN terminate byte codes.

It should be noted that removal of the first length field from the encoding of the attribute value in the fourth phase of the normalization process moves the branching point in the prefix search tree of Index 34 from the length field to the contents of the attribute values, thereby enhancing compression of the index and causing the branching to occur on the attribute values rather than on the relatively immaterial contents, in terms of a name search, contents of the length field.

At this point, a purported Common Name is ready to be used in a search of Index 34 or, in the case of PersonalName to be added to Directory 32, the normalized form of the personal name is ready to be entered into a prefix field of a node of index 34.

The following will now describe the method of the present invention by which Directory System 10 resolves a purported Common Name, provided by a user, either an individual or an applications or system level program, with the Relative Distinguished Names stored in normalized form in Index 34 to find the Directory 32 entry corresponding to the purported name.

It should be noted that Directory System 10 will most generally be able to use a number of different methods for name resolution, for example, a direct AVA to AVA matching algorithm, going the method of the present invention if more direct methods fail or if a user specifically requests the method of the present invention. As previously described, the method of name resolution of the present invention is intended for use in those instances when a purported Common Name to be searched in Index 34 differs from the normalized Relative Distinguished Names stored therein. For example, the purported Common Name may be incomplete or may have certain attributes expressed differently from those in the normalized personal names stored in Index 34.

The method of the present invention for finding the Index 34 entry most closely matching a purported Common Name is illustrated in FIGS. 6A, 6B, 6C and 6D and is described, on a step by step basis, as follows:

Step 150—Normalize the purported Common Name value, as described above and as illustrated in FIG. 5.

Step 152—Count the number N of words appearing in the purported Common Name (purportedCN), with each string of characters delimited by a space and/or a comma being considered a separate word.

Step 154—Determine a score representing an exact match (EM) between this purported Common Name and an Index 34 entry as the result of the expression $$EM = N^5 + N^4 + 2.$$

As will be apparent from the following description of the comparison of purported Common Names with Index 34 entries, the above expression for EM represents the results of the comparison operation when there is an exact match between a purported Common Name and an Index 34 entry.

Step 158—Make an initial guess, designated as G, at the surname field of the purported Common Name by selecting from the purported Common Name the last word before any comma, or the last word in the name if there is no comma.

Step 160—Form the set S of all stored objects in the Directory 32 that have the word G as the last word of their surname fields and have the correct higher order AVAs, if any.

In this regard, and as previously described, the tree comprising Index 34 is constructed from the root node downwards according to the descending order of the AVAs comprising the names of the entries in the tree. The AVAs of a given distinguished name of an entry in Index 34 may be found by concantenating the AVAs stored in the prefix fields of the nodes which are ancestral to the node containing the entry and the AVA or AVAs of the prefix field of the node containing the entry. The higher order AVAs so identified may then be compared with the corresponding higher order AVAs of the purported Common Name to identify the set S of nodes having the same higher order AVAs as the purported Common Name. It should be noted that a prefix field may well contain a fragment of an AVA, rather than the entire AVA. Also, name resolution proceeds on an RDN-by-RDN basis, downwards through the prefix search tree. Therefore, by the time a Common Name AVA is being resolved, the higher-order AVAs have already been matched successfully.

Step 162—For each element e of the set S of Index 34 entries having the word G as the last word of their surname fields, perform the following steps:

Step 163—Initialize a set of five count field values, $C_1$, $C_2$, $C_3$, $C_4$ and $C_5$ to zero. As will be described, these count field values are used to store values representing the results of comparisons of portions of the purported Common Name with corresponding portions of the normalized names read from Index 34 during the comparison of each such normalized name from Index 34 with the purported name. The final count field values are then used to generate, for each name comparison, a score representing the degree to which a purported name matches an Index 34 name.

The comparison score (CS) is generated as the weighted sum of the results of the comparisons of each portion of the purported name with the corresponding portion of an Index 34 name and is represented as:

$$CS = C_1 N^4 + C_2 N^3 + C_3 N^2 + C_4 N + C_5$$

Where N is, as stated above, the number of words in the purported name. It should be noted that the comparison score is also dependent upon the number of words N in the purported Common Name, as is the exact match score.

More specifically, and as will be described in the following description of the name resolution process, $C_1$ is incremented by 1 whenever a word in the purported and entry names matches, either exactly or approximately while $C_2$ is incremented by 1 whenever a word in the purported and entry names matches exactly. $C_3$ is incremented by 1 whenever an alternate first name word in an entry name exactly matches the corresponding word in the personal name subcomponent of the purported name. $C_4$ is incremented by 1 whenever a word in the personal name subcomponent of the entry name is an initial form of the corresponding word in the personal name subcomponent of the purported name, or vice versa. And, $C_5$ is incremented by 1 if the generation and awards subcomponents of the entry and purported names contain the same number of words, or if the personal name subcomponents of the entry and purported names contain the same number of words.

The various combinations of count field values, together with their combination with various powers of N in the equation for CS, allows the comparison score to be weighted for various elements of the names so that certain portions of the names or various degrees of matching or types of matching between names may be assigned greater or lesser significance in determining the degree of match between two names. In the present example, all words in a Common Name are given the same weight, but exact matches between subcomponents or words have been given greater weight than have approximate matches between subcomponents or words.

Step 164—Examine the surname of e, and
  Step 166—If the surname of e contains a single word, add 1 to count field values $C_1$ and $C_2$.
  Step 168—If the surname of e is a multi-word surname, n words long, such as Conan Doyle, form another guess G' at the purported surname by prefixing to G the (n−1) words preceding G in the purported Common Name..
  Step 170—If G' is unequal to the surname of e, remove e from S, select another element e from the set S and return to Step 162, otherwise
  Step 172—Add n to count field values $C_1$ and $C_2$.
Step 174—Form the purported generationAndAwards field GA from the words that follow the comma, if any, in the normalized purported Common Name.
Step 176—For each word in GA, look for an identical word at any position in the generationAndAwards field of the element e.
  Step 178—If a match is found, add 1 to count field values $C_1$ and $C_2$.
  Step 180—In addition, if GA and the generationAndAwards field of e contain exactly the same words, without regard to the order of the words, add 1 to count field value $C_5$.
Step 182—Construct the purported personalName, P, from all words preceding the surname, that is, either G or G' of the purported Common Name
  Step 184—For each successive word w selected from P in left-to-right order, perform the following steps:
    Step 186—Select from the personalName component of the Index 34 entry the word w' that occupies the same position in the Index 34 entry personalName component as w does in P.
    Step 188—If no such word w' exists, proceed to Step 212.
    Step 190—If w=w' add 1 to count field values $C_1$ and $C_2$.
    Step 192—If w is not equal to w', then determine whether w is an "initial" form of w' by the following steps:
      Step 194—Extract the "initial" characters of the word w' by representing the word w' by the expression, $$ir[-ir]^m,$$

where
  i is the initial character of a substring of w' that contains no hyphen characters,
  r is the possibly null remainder of that substring, and
  m is an integer $=>0$.

This expression yields the initial characters of each substring comprising the personalName field w', in their original order and without hyphens, if any. To illustrate by example, assume that the personal name field w' is comprised of the substrings "John" and "Paul". In the first substring i will be "J" and r will be "ohn" and in the second substring i will be "P" and r will be "aul" so that the initials are J and P If the personalName field w' were in the hyphenated form, "John-Paul" the process would again yield J and P.
    Step 196—Compare the initial characters of w' as extracted in Step 194, with w. If w has the form $$i[i|-i]^n \text{ where } n<=m,$$

that is, contains at least some of the the same initial characters as w' in the same sequence as w' and with or without hyphens, then w is an initial form of w' and 1 is added to count field values $C_1$ and $C_4$.
    Step 198—If w is not an initial form of w' as determined by the outcome of Steps 194–196, then return to Step 192 and determine whether w' is an initial form of w by reversing the roles of w' and w in the process of Steps 194 through 196. If w' is an initial form of w, then add 1 to count field values $C_1$ and $C_4$.
    Step 200—If w' is not an initial form of w, and w was not an initial form of w' then remove the element e from the set S, select another element e from the set S and return to Step 162, otherwise
  Step 202—If w is the last word in purported personalName P and w' is the last word in the personal name stored in Index 34, add 1 to count field value $C_5$.
Step 204—Determine the "comparison score" of the element e by the expression:

$$CS = C_1 N^4 + C_2 N^3 + C_3 N^2 + C_4 N + C_5.$$

Step 206—Compare the score CS determined in Step 204 to the score for an exact match (EM) determined in Step 154.
  Step 208—If CS=EM in Step 206, then the name resolution is completed and the process terminates with the return of the contents of the D field 48 to the name resolution procedure to identify the DIBE 38 corresponding to the purported Common Name.
  Step 210—If CS is not equal to EM and the name resolution request has not specified that an "approximate match" is acceptable or if the directory entry is not of the appropriate object class, for example, of the person object class in the case of a resolution of a personal name, then remove the element e from the set S, select another element e from the set S and return to Step 162. Otherwise,
  Step 212—If the element e contains one or more values for the "alternate first name" attribute, repeat Steps 184 through 210, inclusive, for each of the alternate first names in succession. In each of these reiterations of Steps 184 through 210 for alternate first names, substitute each alternate first name for the first word of the personalName component in the Common Name stored in Index 34, but increment count field value $C_3$ instead of count field value $C_2$ in Step 190 whenever the current word "w" is derived from the alternate first name.
  Step 214—Save the maximum score generated over all passes through Steps 182 through 210 for both the original personalName component and for all of the alternate first names and store a count of and the indentities of all entry names having this maximum score, or, if one of the alternative implementations of step 218 is chosen, the count and identities of the entry names having scores within a given range of the maximum score.

Step 216—Select another element e of set S and return to Step 162.

Step 218—This step of the process will be reached if all elements of set S have been examined without finding an exact match for the purported Common Name in the Common Names stored in Index 34. If no exact match is found, select from S the element or elements with the highest score as determined in Step 204. If only one element has that score, return the identity of that element as the best fit for the purported Common Name. If more than one element has this score, either return a message of an ambiguous result, or return the identities of all elements having this score. This step terminates the name resolution process, unless the process has already been terminated at Step 208.

E. Example of the Name Resolution Process

By way of illustrating the name resolution process, suppose the the directory contains entries with the following Common Names:

Arthur Conan Doyle, where "Conan Doyle" is the surname;
Arthur Doyle;
Arthur C. Doyle, with alternate first name "Art";
Edward Doyle.

These are stored in normalized form in the directory index. For instance, "Arthur Conan Doyle" is normalized to:

Doyle Conan [surname separator]Arthur [AVA separator] [RDN separator].

Given a purported Common Name="A. Doyle" the purported Common Name is normalized by removing the "."

An exact match score is computed, where N=2, giving an EM=50, and the count fields are initialized to 0 (zero).

The initial guess G of the purported surname is formed as="Doyle".

Then the process constructs the set S of all index entries whose surname ends with "Doyle" so that S contains all forms of the entries listed above.

For each successive element e of S, the process compares the purported name to e:

(i) e="Arthur Conan Doyle"

Since this entry name has a multi-word surname, a second guess G' is formed of the purported surname, where G'="A. Doyle". Since G' is not equal to the entry's surname of "Conan Doyle" this element e is removed from S.

(ii) e="Arthur Doyle"

This entry name has a single-word surname of "Doyle" which matches G, so $C_1$ is incremented to 1 and $C_2$ is incremented to 1.

Neither the purported name or the entry name has generation and awards components.

The purported personal name P is "A" since this is all that precedes the purported surname G.

The only word w in P is "A" and the corresponding word w' in the entry name is "Arthur"; "A" and "Arthur" do not match.

Since "A"=i, the initial character of "Arthur" w is an initial form of w' and $C_1$ is incremented to 2 and $C_4$ is incremented to 1.

Since w ("A") is the last word in the purported personal name P and w' ("Arthur") is the last word in the entry's personal name, $C_5$ is incremented to 1.

The comparison score for this element is then computed as:

$$CS = C_1 N^4 + C_2 N^3 + C_3 N^2 + C_4 N + C_5$$
$$= 2 \times 2^4 + 1 \times 2^3 + 0 \times 2^3 + 0 \times 2^2 + 1 \times 2 + 1$$
$$= 43$$

and saved as the score for entry name "Arthur Doyle".

(iii) e="Arthur C. Doyle"

This entry again has a single-word surname "Doyle" equal to G, so $C_1$ is incremented to 1 and $C_2$ is incremented to 1.

Both the purported and entry generation and awards fields are empty.

The purported personal name P is "A". The first word w of P is "A" and the corresponding entry word w' is "Arthur" As before, w is not equal to w', but w is an initial form of w' so that $C^1$ is incremented to 2 and $C^4$ is incremented to 1.

Since w is the last word in P, but w' is followed by "C" in the entry personal name, $C^5$ is not incremented as before.

Then, $$CS = 2 \times 2_4 + 1 \times 2^3 + 0 \times 2^1 + 0$$
$$= 42.$$

Since this entry has an alternate first name of "Art", the process repeats the steps of trying to match the personal name component of the purported name, "A", to the entry personal name with the alternate first name substituted, "Art C" "A" is an initial form of "Art", so that $C_1$ is incremented to 2 and $C_4$ is incremented to 1.

The comparison score is calculated again, and found to again be CS=42.

Since both scores for this entry are less than the score of 43 generated for the previous entry, this score is not saved.

(iv) e="Edward Doyle"

This entry has a single-word surname again, which matches G, so $C_1$ is incremented to 1 and $C_2$ is incremented to 1.

The purported personal name P is "A" and the entry personal name is "Edward". "A" is neither a match for, nor an initial form of, "Edward".

CS is then calculated as $$CS = 1 \times 2^4 + 1 \times 2^3 + 0 \times 2^2 + 0 \times 2^1 + 0$$
$$= 24.$$

This score is again less than the current maximum of 43, so that this entry is not the best match for the purported name.

Thus, the second entry "Arthur Doyle" is considered to be the best match for the purported name of "A. Doyle". Either this entry alone, or all entries within some specified range of the maximum score, are returned by the name resolution procedure.

F. Alternate Embodiments of Name Resolution

The presently preferred embodiment of the method for name resolution described above is subject to a number of alternate embodiments or variations, depending upon the particular features desired in a particular embodiment of Directory System 10.

For example, from the previously described assignment of count field values C to the various criteria for matching purported names to Index 34 names, it is apparent that the relative weighting of the matching criteria may be shifted substantially by modifications to the comparison score expression. To illustrate, the expression by which the comparison score is calculated in Step 168, $C_1N^4+C_2N^3+C_3N^2+C_4N+C_5$, favors the identification of a larger number of less exact matches of common name components over the identification of a smaller number of more exact matches. Deletion of the $C_1N^4$ term from the expression would reverse this preference.

In further example, rather than returning only the name or names having the highest match score, the process may return all names having match scores falling within a range whose upper boundary is determined by the highest match score. This would present the requestor with a set of possible matches, so that, should the requestor provide a purported name which by chance most closely matches some name other than the desired name, there is a reasonable probability that the desired name would be returned in the set of possibly matching names and could be identified by the requestor.

The capabilities of the method for name resolution may also be altered by providing more extensive definition of the name attribute components in the purported Common Name, PersonName and normalized formats. For example, at present the generational and awards attributes of a purported name must exactly match the equivalent strings in a name stored in Index 34, that is, Jr. is not a match for Junior. The probability of a match between the generational and awards attributes of purported and stored names could be increased by, for example, providing for aliases or alternates for these strings in the stored names.

In yet another example, a match for a surname will not be recognized unless the surname of a purported Common Name exactly matches a the surname of a name as stored in Index 34. This might be a problem, for example, in Spanish culture countries, where a person may have alternate surnames. Again, this could be provided for by allowing and examining for alternates in surname attributes.

Similarly, the present implementation of the attribute formats for names, and thus the name resolution method, do not provide for the accurate separation of first and middle names, in either purported or stored Common Names. This may cause anomalies during resolution of names involving alternate first names. That is, in the present implementation of the resolution process an alternate first name is always substituted for the first word of a stored Common Name value from Index 34, even when a person's first name actually contains more than one word, such as Mary Ann. For example, assume Directory 32 contains the entry [Common Name="Mary Ann" and alternate="Buffy"], where Mary Ann is a multi-word first name, and the entry [Common Name="Mary Smith" and alternate "Buffy"]. A purported name of "Buffy Ann Smith" will be considered to match "Mary Ann Smith" more closely than "Mary Smith", although both are logically equally good matches. Again, this instance may be provided for in the name resolution process by providing further distinction of the name attribute components in the purported Common Name, PersonName and normalized formats. This would require, however, further standardization and definition of the Common Name formats, and corresponding less flexibility between Directory Systems 10 in the manner in which they represent common names. As previously described, the present implementation of Directory System 10 has elected to provide maximum flexibility in common name formats between Directory Systems 10.

Finally, it is necessary in the present implementation that a purported name be fully resolved before the object class of the corresponding Index 34 entry can be determined. As such, all Directory 32 entries containing Common Name as a naming attribute must store the values of that attribute in the personalName, surname and generationAnd Awards formats for use in the Common Name resolution procedure described above. These distinctions are meaningful, however, only for directory entries of the Person object class. The requirement to resolve the purported names for directory entries not of the Person object class may be eliminated, or reduced, in an alternate embodiment of Directory 32 by, for example, including an indication of the object class that the entry belongs to in the D field 48 of the corresponding Index 34 entry. Upon reaching an Index 34 entry containing a possible matching name, therefore, Directory 32 could read the object class indicator from the node's D field 48 and not execute the name resolution process if the entry was not of the Person object class.

Therefore, while the invention has been particularly shown and described with reference to a preferred embodiment of the method and apparatus thereof, it will be understood by those of ordinary skill in the art that various changes in form, details and implementation may be made therein without departing from the spirit and scope of the invention as defined by the appended claims.

What is claimed is:

1. A method of searching the directory of a database, held in a store of an information processing system, to identify an entry in said directory which most closely matches a search entry; wherein each of said directory entries contains first, second and third information fields, wherein said search entry contains at least a first field, wherein said first field in each of said entries occupies a predetermined position relative to a unique symbol in said entry, wherein each of said fields comprises a string of at least one part, and wherein at least one part of each of said first fields in each of said entries comprises a plurality of characters; said method being carried out by said information processing system executing the steps of:

a) determining the value of a first polynomial by substituting the number of pats in the search entry for a variable in said first polynomial, which value represents an exact match value between the search entry and a directory entry;

b) selecting a first part from said first field of said search entry, said first part being an end part of the string of said first field of said search entry when said first field string of said search entry comprises more than one part;

c) selecting from said directory the set of all directory entries having a first part of the first field thereof which is the same as the part selected in step (b) and entering said set into a store of said system, said first part of said first field of each of the selected directory entries being an end part of the string of the first field of said directory entry when said first field string of said selected directory entry comprises more than one part;

d) selecting from said store one of said directory entries of the set entered into said store in step (c);

e) initializing the variables of a second polynomial, each variable of said second polynomial being used to represent respectively the number of successful comparisons between portions of a field of the search entry and portions of a corresponding field of a directory entry;

f) determining the number of parts of the first field of said selected directory entry, and (f$_1$) if said first field of said selected directory entry comprises a single part, increasing by a first predetermined amount the values of corresponding certain variables of said second polynomial, and then proceeding to step (g) but (f) if said first field of said selected directory entry comprises a string of more than one part, comparing said first field of said selected directory entry with said first field of said search entry, and, f$_{2-1}$) if said first field of said selected directory entry is the same as a string of parts of said first field of said search entry, increasing by a second predetermined amount the values of corresponding certain variables of said second polynomial, and then proceeding to step (g), but (f$_{2-2}$) if said first field of said selected directory entry is not the same as a string of parts of the first field of said search entry, proceeding to step (g);

g) comparing the value of said second polynomial with said exact match value for said search entry, and (g$_1$) if said value of said second polynomial equals said exact match value, identifying the corresponding directory entry of said set as the entry searched for, but (g$_2$) if said value of said second polynomial is not equal to said exact match value, determining whether all directory entries have been selected from said store, and (g$_{2-1}$) if all directory entries have not been selected from said store, selecting another directory entry from said store and proceeding to step (e), but (g$_{2-2}$) if all directory entries have been selected from said store, identifying the directory entry in said store for which the highest value of said second polynomial was developed as the entry searched for.

2. The method of claim 1, wherein said step (g) comprises the substeps of:

(g$_{01}$) determining whether said search entry contains other fields than said first field, and (g$_{01-1}$) if said search entry contains none of said other fields proceeding to substep (g$_{02}$), but (g$_{01-2}$) if said search entry contains at least one of said other fields, making comparisons between said other fields and respective ones of said second and third fields of said selected directory entry and increasing by a third predetermined amount the values of certain variables of said second polynomial, and then proceeding to substep (g$_{02}$);

(g$_{02}$) comparing the value of said second polynomial with said exact match value for said search entry, and (g$_{02-1}$) if said value of said second polynomial equals said exact match value, identifying the corresponding directory entry of said set as the entry searched for, but (g$_{02-2}$) if said value of said second polynomial is not equal to said exact match value, determining whether all directory entries have been selected from said store, and (g$_{02-21}$) if all directory entries have not been selected from said store, selecting another directory entry from said store and proceeding to step (e), but (g$_{02-22}$) if all directory entries have been selected from said store, identifying the directory entry in said store for which the highest value of said second polynomial was developed.

3. A method of searching the directory of a database, held in a store of an information processing system, to identify an entry in said directory which most closely matches a search entry; wherein each of said directory entries contains first, second and third information fields, wherein said search entry contains at least a first field, wherein each of said entries represents the name of a person and wherein, in each of said entries, each of said first fields represents a surname, each of said second fields represents generations and awards related to the respective one or said first fields, and each of said third fields represents a personal name of the person represented by the respective one of said first fields, wherein said first field in each of said entries occupies a predetermined position relative to a unique symbol in said entry, wherein each of said fields comprises a string of at least one pat, and wherein at least one part of each of said first fields in each of said entries comprises a plurality of characters; said method being carried out by said information processing system executing the steps of:

a) determining the value of a first polynomial by substituting the number of parts in said search entry for a variable in said first polynomial, which value represents an exact match value between the search entry and a directory entry;

b) selecting a first part from said first field of said search entry, said first part being an end part of the string of said first field of said search entry when the first field string of said search entry comprises more than one part;

c) selecting from said directory the set of all directory entries having a first part of the first field thereof which is the same as the part selected in step (b) and entering said set into a store of said system, said first part of said first field of each of the selected directory entries being an end part of the string of the first field of said directory entry when said first field string of said selected directory entry comprises more than one part;

d) selecting from said store one of said directory entries of the set entered into said store in step (c);

e) initializing the variables of a second polynomial, each variable of said second polynomial being used to represent respectively the number of successful different comparisons between portions of a field of the search entry and portions of a corresponding field of a directory entry;

f) determining the number of parts of the first field of said selected directory entry, and (f$_1$) if said first field of said selected directory entry comprises a single part, increasing by a first predetermined amount the values of corresponding certain variables of said second polynomial, and then proceeding to step (g) but (f$_2$) if said first field of said selected directory entry comprises a string of more than one pat, comparing said first field of said selected directory entry with said first field of said search entry, and (f$_{2\text{-}1}$) if said first field of said selected directory entry is the same as a string of parts of said first field of said search entry, increasing by a second predetermined amount the values of corresponding certain variables of said second polynomial, and then proceeding to step (g), but (f$_{2\text{-}2}$) if said first field of said selected directory entry is not the same as a string of parts of the first field of said search entry, proceeding to step (g); g) comparing the value of said second polynomial with said exact match value for said search entry, and (g$_1$) if said value of said second polynomial equals said exact match value, identifying the corresponding directory entry of said set as the entry searched for, but (g$_2$) if said value of said second polynomial is not equal to said exact match value, determining whether all directory entries have been selected from said store, and (g$_{2\text{-}1}$) if all directory entries have not been selected from said store, selecting another directory entry from said store and proceeding to step (e), but (g$_{2\text{-}2}$) if all directory entries have been selected from said store, identifying the directory entry in said store for which the highest value of said second polynomial was developed as the entry searched for.

* * * * *